United States Patent Office 3,380,960
Patented Apr. 30, 1968

3,380,960
STABILIZED HYDROCARBON POLYMER
COMPOSITIONS
Herman G. Ebner, Whiting, Ind., assignor to Standard Oil Company, Chicago, Ill., a corporation of Indiana
No Drawing. Filed Aug. 28, 1964, Ser. No. 392,902
6 Claims. (Cl. 260—666.5)

This invention relates to a process for stabilizing hydrocarbon polymers against deterioration. More specifically, my invention relates to the inhibition of color formation and the reduction in acid number increase of hydrocarbon polymers susceptible to deterioration in storage. My invention is particularly applicable to the stabilization of normally liquid hydrocarbon polymers obtained from polymerization of lower molecular weight olefins with Friedel-Crafts type catalysts.

The hydrocarbon polymers of relatively lower molecular weight, which are liquid materials at or near normal or moderately elevated temperatures, find a wide variety of uses in applications similar to those for which mineral oils are commonly used, and in some applications are superior to the ordinary mineral oils. The uses include, but are not limited to, uses in caulking compounds, adhesives, mold release compounds, plasticizing agents, metal rolling oils, paints, rubbers, leather impregnants, inks, and various electrical insulating applications, such as use for transformer oils, as cable oils to fill pipes carrying electrical cables, to impregnate insulators around electrical conductors, etc. These hydrocarbon polymers are commonly made by the polymerization of lower molecular weight olefins, containing from 2 to 6 carbon atoms, with Friedel-Crafts type catalysts. Especially useful materials are polybutenes composed predominantly of mono-olefins having average molecular weights ranging from 300 to 2600. These, and the similar hydrocarbon polymers made from olefins other than the butenes, are generally recovered as lightly colored or colorless polymers which are stable when exposed to light, non-drying, and residue-free when volatilized. For electrical applications, such as use as transformer and cable oils, it is desirable that the hydrocarbon polymers be resistant to an increase in acid number when exposed to prolonged air exposure at elevated temperatures. For customer appeal, it is also desirable that the oils be relatively color stable during prolonged use. Though the polybutenes commonly used in electrical applications are generally more color stable than conventional mineral oils of corresponding initial color and of a corresponding suitability for such use, their color stability is sensitive to air exposure at elevated temperatures; it is thus important to minimize the time that such materials are in contact with air while hot. As a consequence, it has been recognized in the art that storage under inert gas blanketing is advisable when polybutenes are to be held in a heated state for prolonged periods.

I have discovered that oil-soluble tetraalkyl ammonium borohydrides are excellent color stabilizers for hydrocarbon polymers. I have further discovered that the combination of a tetraalkyl amomnium borohydride with a small amount of a hindered phenol type of antioxidant material is effective to stabilize hydrocarbon polymers, as described herein, against both color formation and acid number increase.

The polymers which can be advantageously stabilized according to the process of my invention are in general Friedel-Crafts polymerization products of lower olefins, that is, olefins containing from 2 to 6 carbon atoms. Such polymerization products contain up to as much as 85 to 98 percent of mono-olefinic hydrocarbons, the balance being generally isoparaffinic. Typical hydrocarbon polymers which are benefited by my invention are those having molecular weights in the range of from about 300 to about 2600, pour points of from about $-60°$ F. to about $+65°$ F. and viscosity index values, as determined by ASTM Method D–567, which range from about 60 to about 122. Obviously, hydrocarbon polymers produced with catalysts other than the Friedel-Crafts type can also benefit from the application of my stabilizing process if their properties resemble those defined above.

The tetraalkyl ammonium borohydrides useful in the practice of my invention are those containing alkyl groups having a sufficient number of carbon atoms to produce solubility in non-polar organic solvents. These are such tetraalkyl ammonium borohydrides as cetyl trimethyl ammonium borohydride, tricapryl methyl ammonium borohydride, and the like. In general, useful oil-soluble tetraalkyl ammonium borohydrides are those containing at least 10 to 12 carbon atoms in the alkyl substituents. I have found that a particularly desirable stabilizer from the points of ready availability and ease of use is tricapryl methyl amomnium borohydride.

The hindered phenols useful in the practice of my invention to provide stability of hydrocarbon polymers against acid number increase, in combination with the tetraalkyl ammonium borohydrides, which provide color inhibition, are such phenols as 2,2'-methylene-bis[6-(2-methylcyclohexyl) p-cresol]; 2,4-dimethyl-6-tert-butyl phenol; 4,4'-ethylidenedi-o-cresol; 4,4'-methylene - bis(2,6 - dialkyl phenols); 1,1'-thiodi-2-naphthol; 4,4-thiobis(6-tert.-butyl-o-cresol) and the like. A particularly useful oxidation inhibitor, desirable because of its ready availability, is 2,6-di-tert-butyl-p-cresol.

The amounts of the color stabilizer and of the acid number stabilizer to be used in the practice of my invention are generally within the range of from about 0.0005 weight percent to 0.2 weight percent, and desirably within the range of about 0.005 weight percent to 0.02 weight percent, though greater amounts may be necessary with highly unstable hydrocarbon polymers and lesser amounts may be sufficient with hydrocarbon polymers of a normally high stability. Larger amounts of acid number stabilizer may be necessary to achieve particularly long periods of stability which are desirable for cable oils. The particular quantity which should be used with a hydrocarbon can be readily determined by simple experimentation. It is, of course, desirable to use as little stabilizer as possible to minimize the expense. The stabilizers are simply added to the hydrocarbon polymer and dissolved, for example, by stirring or even by the turbulence of normal handling operations. For convenience, the stabilizers can be added to the hydrocarbon polymer in the form of a concentrated solution in a solvent which does not adversely affect the hydrocarbon polymer. Such solvents can be, for example, polybutenes or xylenes.

The beneficial results to be achieved through the practice of my invention are apparent in the examples presented hereinbelow, which compare the increase in color and in acid number for an untreated polybutene, having an average molecular weight of about 400, a viscosity index of about 60 and a pour point of about $-25°$ F., with the results obtained with different amounts of color and acid number stabilizers. Treated and untreated samples of hydrocarbon polymer were subjected to an accelerated aging test conducted at 200° F., in an electrically heated oven, for 64 hours. The oven was equipped with a blower for air circulation to maintain a uniform temperature and effect a constant introduction of a minor proportion of fresh air and a constant exhaust of heated air. Following the aging treatment, the light absorbed by the polybutene samples as compared to distilled water was measured by means of a Fischer Electrophotometer equipped with a No. 425 blue filter. The color values are expressed in units of $ODU_{425}$, i.e. the optical density multiplied by 100. The original polybutene sample had a 6.0 $ODU_{425}$ value, before aging, and an acid number of 0.00, expressed as milligrams of KOH per gram of hydrocarbon.

| Example | Additive | Concentration of Additive, Weight Percent | $ODU_{425}$ Aged Sample | Acid Number, mg. KOH/ g. Aged Sample |
|---|---|---|---|---|
| 1 | None | | 15.0 | 0.13 |
| 2 | TMAB [1] | 0.02 | 4.0 | 0.10 |
| 3 | TMAB | 0.01 | 4.0 | 0.10 |
| 4 | TMAB | 0.005 | 6.0 | 0.09 |
| 5 | TMAB | 0.001 | 13.0 | 0.09 |
| 6 | DBPC [2] | 0.1 | 12.8 | 0.01 |
| 7 | DBPC | 0.02 | 12.3 | 0.015 |
| 8 | DBPC | 0.005 | 12.5 | 0.015 |
| 9 | {TMAB / DBPC} | 0.02 / 0.02 | 8.0 | 0.02 |
| 10 | {TMAB / DBPC} | 0.01 / 0.02 | 9.5 | 0.02 |
| 11 | {TMAB / DBPC} | 0.02 / 0.01 | 4.0 | 0.08 |
| 12 | {TMAB / DBPC} | 0.01 / 0.01 | 5.0 | 0.08 |
| 13 | {TMAB / DBPC} | 0.005 / 0.01 | 6.0 | 0.04 |
| 14 | {TMAB / DBPC} | 0.001 / 0.01 | 10.5 | 0.02 |

[1] TMAB—Tricapryl methyl ammonium borohydride.
[2] DBPC—2,6-di-tertiary-butyl-p-cresol.

Results comparable to the above can be obtained with other hydrocarbon polymers, such as the polyethylenes, polypropenes, polypentenes and polyhexenes described herein, and with other oil-soluble alkyl ammonium borohydrides and hindered phenol anti-oxidants. It is apparent from the above results that oil-soluble tetraalkyl ammonium borohydride compounds effect a stabilization of polymeric hydrocarbons against color deterioration and the combination of a tetraalkyl ammonium borohydride with a hindered phenol results in stabilization against both color deterioration and acid number increase. Alkyl ammonium borohydrides which are mono-, di-, and tri-alkyl substituted may also be used in the practice of my invention, so long as the alkyl group or groups are of sufficient size as described hereinabove to provide the requisite oil-solubility.

Having thus described my invention, what I claim is:

1. A composition comprising a stabilizing amount of tetraalkyl ammonium borohydride and a hindered phenol antioxidant selected from the group consisting of 2,2'-methylene-bis; 2,4-dimethyl-6-tert-butyl phenol; 4,4'-ethylidenedi-o-cresol; 4,4'-methylene-bis(2,6-dialkyl phenols); 1,1'-thiodi-2-naphthol; 4,4'-thiobis(6-tert-butyl-o-cresol) and 2,6-di-tert-butyl-p-cresol, in a liquid polymer of a mono-alpha olefin made by Friedel-Crafts type catalyst polymerization of an olefin containing from 2 to 6 carbon atoms.

2. The composition of claim 1 wherein said amount of said tetraalkyl ammonium borohydride is from about 0.005 to about 0.04 weight percent.

3. The composition of claim 2 wherein said tetraalkyl ammonium borohydride is tricapryl methyl ammonium borohydride and said hindered phenol antioxidant is 2,6-di-tertiary-butyl-para-cresol.

4. A composition comprising a stabilizing amount of an oil-soluble tetraalkyl ammonium borohydride in a liquid polymer of a mono-alpha olefin made by Friedel-Crafts type catalyst polymerization of an olefin containing from 2 to 6 carbon atoms.

5. The composition of claim 4 wherein said amount of said tetraalkyl ammonium borohydride is from about 0.005 to about 0.20 weight percent.

6. The composition of claim 5 wherein said tetraalkyl ammonium borohydride is tricapryl methyl ammonium borohydride.

References Cited
UNITED STATES PATENTS

| | | | |
|---|---|---|---|
| 2,738,369 | 3/1956 | Banus et al. | 252—567.6 |
| 3,026,264 | 3/1962 | Rocklin et al. | 260—45.95 |
| 3,230,225 | 1/1966 | Arrigo | 260—290 |

DONALD E. CZAJA, *Primary Examiner.*

V. P. HOKE, *Assistant Examiner.*

UNITED STATES PATENT OFFICE
CERTIFICATE OF CORRECTION

Patent No. 3,380,960            April 30, 1968

Herman G. Ebner

It is certified that error appears in the above identified patent and that said Letters Patent are hereby corrected as shown below:

Column 4, lines 7 and 8, "2,2′-methylene-bis" should read -- 2,2′-methylene-bis[6-(2-methylcyclohexal)p-cresol] --.

Signed and sealed this 16th day of December 1969.

(SEAL)
Attest:

Edward M. Fletcher, Jr.            WILLIAM E. SCHUYLER, JR.
Attesting Officer                 Commissioner of Patents